United States Patent [19]

Nissen et al.

[11] 4,293,657

[45] Oct. 6, 1981

[54] STABLE MELAMINE POLYOL DISPERSIONS, A PROCESS FOR THEIR MANUFACTURE AND FOR THE PREPARATION OF FOAMED POLYURETHANE PLASTICS

[75] Inventors: Dietmar Nissen, Heidelberg; Matthias Marx, Bad Duerkheim; Wolfgang Jarre, Ludwigshafen; Ernst Schoen, Neustadt; Walter Decker, Ludwigshafen, all of Fed. Rep. of Germany

[73] Assignee: BASF Aktiengesellschaft, Ludwigshafen, Fed. Rep. of Germany

[21] Appl. No.: 166,636

[22] Filed: Jul. 7, 1980

[30] Foreign Application Priority Data

Aug. 9, 1979 [DE] Fed. Rep. of Germany ....... 2932304

[51] Int. Cl.³ ............................................ C08G 18/14
[52] U.S. Cl. .................................... 521/121; 252/182; 521/122; 521/123; 521/124; 521/125; 521/166
[58] Field of Search ............... 521/121, 122, 123, 124, 521/125, 166; 252/182

[56] References Cited

U.S. PATENT DOCUMENTS

| | | | |
|---|---|---|---|
| 4,108,791 | 8/1978 | Wasilczyk | 252/182 |
| 4,115,300 | 9/1978 | Chakirof | 252/182 |
| 4,141,852 | 2/1979 | Hogan et al. | 252/182 |
| 4,197,373 | 4/1980 | Miano et al. | 521/166 |

*Primary Examiner*—Maurice J. Welsh
*Attorney, Agent, or Firm*—Norbert M. Lisicki

[57] ABSTRACT

Stable melamine-polyoxyalkylene polyether polyol dispersions are prepared by the in situ reduction of melamine particles wherein 90 percent of the melamine particles have a particle size of less than 10 microns. Stabilizers for the melamine-polyol dispersion are selected from the group consisting of
(a) silicic acids and silicates,
(b) salts of perfluorinated alkyl carboxylic acids having 4 to 20 carbon atoms, salts of alkyl sulfonic acids and perfluorinated alkylsulfonic acids having 4 to 20 carbon atoms and polyperfluoroether polyols having molecular weights of 300 to 6000, and
(c) salts of fatty alcohol sulfates having 6 to 30 carbon atoms.

These dispersions are useful for the preparation of polyurethane foams.

12 Claims, No Drawings

STABLE MELAMINE POLYOL DISPERSIONS, A PROCESS FOR THEIR MANUFACTURE AND FOR THE PREPARATION OF FOAMED POLYURETHANE PLASTICS

BACKGROUND OF THE INVENTION

1. Field of the Invention

The invention relates to stable melamine-polyol dispersions consisting of (A) 5 to 70 percent by weight of melamine bsed on the total weight of melamine and polyol with 90 percent of the melamine particles having a particle size less than 10 microns, (B) 95 to 30 percent by weight of a polyol based on the total weight of melamine and polyol, and (C) 0.001 to 20 percent by weight of at least one stabilizer based on the weight of melamine.

These dispersions are produced by the in situ size reduction with high local energy densities such as 10 to 3000 kilowatt hours per cubic meter and simultaneous dispersion of the melamine in polyols. The dispersions are useful for the manufacture of foamed polyurethane plastics.

2. Prior Art

The preparation of dispersions with organic polymers and hydroxyl group-containing polyethers is well known to those skilled in the art. For this purpose, aqueous polymer dispersions are commonly mixed with polyether polyols followed by the removal of the water. It has also been taught that graft polymers may be produced by the in situ polymerization of ethylenically unsaturated monomers in ethylenically unsaturated polyether polyols which resulting products are then employed for the manufacture of polyurethanes.

According to German Patent Application P 28 50 609.4, stable filler polyol dispersions are obtained when organic or inorganic fillers in the presence of polyols are reduced to particle sizes smaller than 7 microns using high local energy densities during the dispersion process. The use of melamine as a filler is not mentioned in this published application.

The use of melamine as a flame-protection agent for the manufacture of isocyanurate group-containing foamed polyurethane plastics is described in German Published Application Nos. 20 43 917, 23 48 838, and 28 09 084. According to these publications, the melamine is incorporated into the polyol immediately prior to the manufacture of the foam. One drawback is that the melamine polyol mixtures must be processed immediately since the melamine will settle out of solution within a very short period of time.

The purpose of this invention is to produce dispersions of melamine in polyols which can be easily handled, which are stable under storage conditions, and which do not tend toward sedimentation of the dispersed melamine.

BRIEF DESCRIPTION OF THE INVENTION

Surprisingly, it was found that storage-stable melamine-polyol dispersions can be obtained if the melamine is crushed while dispersed in the polyols in the presence of certain stabilizers in such a manner that 90 percent of melamine particles result in a particle size of less than 10 microns. Particularly advantageous results are achieved if the stabilizers are selected from the group consisting of (a) silicic acids and siicates, (b) salts of perfluorinated alkylcarboxylic acids, alkylsulfonic acids and perfluorinated alkylsulfonic acids and polyperfluoroether polyols, and (c) salts of fatty alcohol sulfates.

Thus, the object of this invention are stable melamine-polyol dispersions consisting of (A) 5 to 70 percent by weight, based on the total weight of melamine and polyol with 90 percent of the melamine particles having a particle size of less than 10 microns, (B) 95 to 30 percent by weight, based on the total weight of melamine and polyol, of a polyol having a molecular weight of 200 to 16,000, and (C) 0.001 to 20 percent by weight of at least one stabilizer, based on the weight of melamine.

After storage periods of more than four months, the melamine-polyol dispersions did not show any evidence of melamine deposits (sedimentation). Another advantage is that the dispersions, even with very high melamine contents such as 50 percent by weight based on the weight of melamine and polyol at 50° C., normally had viscosities of less than 4000 mPas and could therefore be handled easily by the multi-component processing machines commonly used for the manufacture of polyurethanes.

The viscosity of the melamine-polyol dispersions is, among other things, a function of the type and quantity of the added stabilizer and particularly of the melamine content of the dispersion. At 50° C., and in the presence of the same stabilizer, for example, the viscosity, of 800 mPas at a melamine content of 24 percent by weight, increases to 3100 mPas at a melamine content of 50 percent by weight.

DESCRIPTION OF THE PREFERRED EMBODIMENTS

It is of primary importance to this invention that 90 percent or more of the melamine particles in the melamine-polyol dispersions have a particle size of less than 10 microns, preferably less than 6 microns, with the melamine particles having the following grain size distribution after size reduction:

90% of the particles are smaller than 10 microns,
70% of the particles are smaller than 4.5 microns,
50% of the particles are smaller than 3 microns,
30% of the particles are smaller than 2 microns, and
10% of the particles are smaller than 1.5 microns.

It is further important that the melamine is reduced in size to these particle sizes in situ in the polyols, in the presence of the stabilizers, by using high local energy densities. High local energy densities, in the sense of this invention, are understood to be energy densities of 10 to 3000 kilowatt hours per cubic meter, preferably 20 to 1000 kilowatt hours per cubic meter. This corresponds with related outputs per volume-power unit of approximately 100 to 2500 kilowatts per cubic meter.

The melamine-polyol dispersions, which contain 5 to 70 percent by weight, preferably 15 to 50 percent by weight, melamine and 95 to 30 percent by weight, preferably 85 to 50 percent by weight, polyol based on the melamine-polyol weight are produced in the following manner:

Melamine, polyol and stabilizer are mixed and are reduced to the described particle sizes in situ at temperatures of 30° to 100° C., preferably 40° C. to 80° C. Normally 1 to 10, preferably 2 to 6, grinding passes are employed. For example, the total amount of melamine may be mixed with the total amount of polyol and stabilizer at temperatures of, for example, 10° C. to 30° C. However, it is also possible to mix the entire polyol amount with a certain portion of the melamine and the stabilizer, to reduce the melamine particles of this mixture to a certain size and to then incorporate the residual melamine portion in this mixture for further grinding. It is also possible to grind a partial amount of polyol with the entire melamine amount in the presence of the stabilizer and then additional polyol and possibly additional stabilizer may be added during the grinding process.

The size reduction may be carried out, for instance, in mechanical dispersing devices, preferably in dispersing machines having high energy level densities and containing grinding elements such as ball mills, sand mills, Netsch mills, bead mills, dyno mills, planetary ball mills, and bowl mills. Preferably, ball-shaped grinding elements may be employed which are made of glass, ceramic material, metal, hard abrasion-resistant plastics such as polyamides, and which have diameters of 0.2 to 8, preferably 0.4 to 5 millimeters.

The melamine-polyol dispersions according to this invention may furthermore be mixed with additional polyol and thus may be adjusted to any required solids contents. The polyol components derived in this manner are stable under storage conditions for more than 4 months and do not exhibit any melamine sedimentation.

Melamine is used in its commercially-available form and generally has the following distribution of grain sizes:

10% by weight of the particles are larger than 30 microns,

30% by weight of the particles are larger than 24 microns,

50% by weight of the particles are larger than 20 microns,

70% by weight of the particles are larger than 16 microns, and, 90% by weight of the particles are larger than 11 microns.

Suitable polyols which are used as dispersing medium have functionalities of 2 to 8, preferably 2 to 3, and molecular weights of 200 to 16,000, preferably 200 to 8000. Proven to work well, and therefore preferably used, are polyester polyols and in particular, polyoxyalkylene polyether polyols. Other hydroxyl group-containing polymers having the above-disclosed molecular weights such as polyester amides, polyacetals such as polyoxymethylene, and butanediol formals, and polycarbonates, particularly those produced from diphenylcarbonate and 1,6-hexanediol by transesterification, may also be employed.

For special areas of application, the polyols may be partially replaced by monofunctional primary and/or secondary hydroxyl group-containing compounds having molecular weights of 200 to 16,000. If monofunctional hydroxyl compounds are used, they are incorporated in quantities of 1 to 30 percent by weight, preferably of 2 to 15 percent by weight, based on the polyol weight.

The polyester polyols may, for instance, be produced from dicarboxylic acids, preferably aliphatic dicarboxylic acids having 2 to 12, preferably 4 to 8, carbon atoms in the alkyl radical reacted with multifunctional alcohols, preferably diols. Aliphatic dicarboxylic acids such as pimelic acid, suberic acid, azelaic acid, sebacic acid, undecanedioic acid, dodecanedioic acid, and preferably succinic, glutaric and adipic acid and aromatic dicarboxylic acids such as phthalic acid and terephthalic acid may be employed. Alcohols which may be employed are 1,2- and/or 1,3-propylene glycol, dipropylene glycol, 1,6-hexanediol, 1,10-decanediol, glycerine, trimethylolpropane, preferably ethylene glycol, diethylene glycol and 1,4-butanediol.

The dicarboxylic acids and bifunctional alcohols may be used individually as well as in the form of mixtures. For example, polyester polyols based on adipic acid-diethylene glycol, adipic acid-hexanediol-neopentyl glycol, adipic acid-ethylene glycol-butanediol, adipic, glutaric, succinic acid-ethylene glycol-diethylene glycol are useful.

The polyester polyols are commonly di- to trifunctional and have molecular weights of 800 to 4000, preferably 1500 to 3000 and hydroxyl numbers of 28 to 110, preferably of 35 to 110.

The preferred polyols are polyoxyalkylene polyether polyols which are produced according to methods well known to those skilled in the art from one or more alkylene oxides having 2 to 4 carbon atoms in the alkylene radical and an initiator molecule containing 2 to 8, preferably 2 to 4, active hydrogen atoms. Suitable alkylene oxides include 1,2-propylene oxide, 1,2- or 2,3-butylene oxide, and ethylene oxide. Preferred are ethylene oxide and 1,2-propylene oxide. Tetrahydrofuran and styrene oxide may also be employed. The alkylene oxide may be used individually, alternatingly in sequence, or as mixtures. Possible initiator molecules include: water, dicarboxylic acids such as succinic acid, adipic acid, phthalic acid and terephthalic acid; N-mono-, N,N- and N,N'-dialkyl-substituted diamines with 1 to 4 carbon atoms in the alkyl radical; mono- and dialkyl-substituted ethylenediamines; 1,2- or 1,3-propylenediamine; 1,4-butylenediamine; 1,6-hexamethylenediamine; and 4,4'-, 2,4'- and 2,2'-diaminodiphenylmethane; 2,4- and 2,6-diaminotoluene; alkanolamines such as ethanolamine, diethanolamine, N-methyl- and N-ethyldiethanolamine, and triethanolamine, hydrazine and polyhydroxyl compounds such as ethylene glycol, 1,2- and 1,3-propylene glycol, diethylene glycol, dipropylene glycol, 1,4-butanediol, 1,6-hexanediol, glycerine, trimethylolpropane, pentaerythritol, sorbitol and sucrose.

Preferably used are di- and/or trifunctional polyether polyols having molecular weights of 200 to 16,000, preferably 200 to 8000, and hydroxyl numbers of 20 to 600, preferably of 20 to 110, containing ethylene oxide as well as 1,2-propylene oxide units in the oxyalkylene chain with the latter being arranged in the oxyalkylene chain either randomly or in form of blocks. Polyether polyols having primary hydroxyl groups are preferred and more preferred are trifunctional polyether polyols having hydroxyl numbers of 20 to 60.

Suitable compounds having monofunctional hydroxyl groups, which may possibly be used in mixture with the polyols, include hydroxyl group-containing polyethers having molecular weights of 200 to 16,000, preferably 400 to 4000, which are obtained by reacting the above-described alkylene oxides with monofunctional initiator molecules. Detailed examples of monofunctional initiator molecules are as follows: low-molecular weight monofunctional aliphatic alcohols having 1 to 18, preferably 1 to 6, carbon atoms in the alkyl radical such as methanol, ethanol, propanol, butanol, hexanol, decanol, lauryl alcohol, neopentyl alcohol, 2-ethylhexanol, cyclohexanol, tertiary butylcyclohexanol, phenylethanol, and particularly allyl alcohol and methylbutanol; aromatic monohydroxyl compounds having 6 to 14 carbon atoms such as phenol and naphthol, alkylated phenols such as cresol, trimethylphenol, nonylphenols, dodecylphenols and others, and organic monocarboxylic acids having 1 to 18 carbon atoms such as acetic acid, propionic acid, butyric acid, 2-ethylhexanoic acid, acrylic acid and similar compounds. The initiator molecules may be used individually as well as in mixtures and the alkylene oxides may be used for the polymerization, individually, alternatingly in sequence, or in mixtures. The polymerization of the alkylene oxides with the initiator molecule is carried out under well-known reaction conditions in the presence of commonly-used catalysts. Hydroxyl group-containing polyethers from tetrahydrofuran or mixtures of tetrahydrofuran with the above-referenced alkylene oxides, may also be used.

Relatively stable dispersions may be obtained by the in situ size reduction of the melamine in polyol to particle sizes of less than 10 microns of at least 90 percent of the melamine particles. However, this effect can be considerably improved by adding selected stabilizers in quantities of 0.001 to 20 percent by weight, preferably 0.005 to 5 percent by weight, based on the weight of the melamine. The following stabilizers have been found to work particularly well:

(a) silicic acids and silicates, (b) salts, preferably alkali metal salts such as sodium or potassium salts, and ammonium salts, of perfluorinated alkylcarboxylic acids having 4 to 20, preferably 8 to 18, carbon atoms, salts of alkylsulfonic acid and perfluorinated alkylsulfonic acids having 4 to 20, preferably 8 to 18, carbon atoms, as well as polyperfluoroether polyols having molecular weights of 300 to 6000, preferably of 500 to 4000, and (c) salts of fatty alcohol sulfates having 6 to 30, preferably 8 to 22, carbon atoms.

Those preferred are mixtures of at least one stabilizer of group (a) and/or at least one stabilizer of group (b) and/or at least one stabilizer of group (c).

The silicic acids and silicates are used in quantities of 0.01 to 20 percent by weight, preferably 0.05 to 5 percent by weight based on the weight of melamine. The silicic acid may be produced by flame hydrolysis or by precipitation. Silicic acids obtained by flame hydrolysis may, for example, be obtained under the tradename of ®Aerosil produced by Degussa, Frankfurt. These products have bulk densities of approximately 40 to 60 grams per liter, surfaces according to the BET method of approximately 130 to 410 square meters per gram (S. Brunauer et al, Journal American Chemical Society, 60, 309 (1938, and contain more than 99.8 percent $SiO_2$, <0.05 percent $Al_2O_3$, <0.003 percent $Fe_2O_3$, <0.03 percent $TiO_2$, and <0.025 percent hydrogen chloride.

Precipitative silicic acids have tamping densities (according to DIN 53 194) of 70 to 200 grams per liter, surfaces according to BET of 160 to 650 square meters per gram, and contain 98 to 99.5 percent $SiO_2$, 0.2 percent $Al_2O_3$, 0.01 to 0.03 percent $Fe_2O_3$, and 0.2 to 1.0 percent $Na_2O$.

Precipitated silicic acids are produced, for example, by Degussa in Frankfurt and may be purchased under the names of precipitated silicic acids FK 320, FK 300, FK 310, FK 383, ®Sipenat and ®Durosil.

Silicates, which can be used in accordance with this invention, have tamping densities (according to DIN 53 194) of approximately 135 to 165 grams per liter, surfaces according to BET of 35 to 100 square meters per gram, and contain approximately 66 to 91 percent $SiO_2$, 0.2 to 26 percent $Al_2O_3$, approximately 0.03 percent $Fe_2O_3$, approximately 6 percent CaO and approximately 2 to 8 percent $Na_2O$. Corresponding products are produced by Degussa in Frankfurt and are marketed under the tradenames Aluminum Silicate P 820, ®Transpafill and ®Calsil.

The stabilizers of groups (b) and (c) are used in quantities of 0.001 to 5 percent by weight, preferably 0.005 to 1 percent by weight, based on the weight of melamine. These include: the potassium salts of perfluorinated alkylcarboxylic acids having 4 to 20 carbon atoms such as perfluorocaproic acid, perfluoroheptanoic acid, perfluorooctanoic acid, perfluoroperagonic acid, perfluorocapric acid, perfluorolauryic acid, perfluoromyristic acid, perfluoropalmitic acid, perfluorostearic acid, perfluorooleic acid, perfluorolinoleic acid, prfluorolinolenic acid, the potassium salts of perfluorinated alkylsulfonic acids having 4 to 20 carbon atoms such as perfluorobutanesulfonic acid, perfluoropentanesulfonic acid, perfluorohexanesulfonic acid, perfluoroheptanesulfonic acid, perfluorooctanesulfonic acid, perfluorododecanesulfonic acid, and perfluorohexadecanesulfonic acid, and polyperfluoroether polyols having molecular weights of 300 to 6000 such as the corresponding polymerizates of tetrafluoroethylene oxide and hexafluoropropene epoxide as well as salts of fatty alcohol sulfates such as sodium lauryl sulfate.

Potassium perfluoroalkylsulfonates, ammonium perfluoroalkylcarboxylates, potassium fluoroalkylcarboxylates, and fluorinated alkylpolyoxyethylene ethanol are commercial products and are marketed by the 3M company under the trademark ®Fluorad. Sodium salts of fatty alcohol sulfates, for example, lauryl sulfate, are also available under the tradename of ®Duponol by Dupont.

The melamine-polyol dispersions are preferably used for the manufacture of polyurethanes, particularly polyurethane foams. However, they may also be used for the manufacture of polyisocyanurate and polycarbodiimide foams.

In addition to the melamine-polyol dispersions according to this invention, materials such as polyols, polyisocyanates, catalysts, blowing agents, chain extenders, auxiliaries and additives may be used for the manufacture of the preferably foamed polyurethanes.

Suitable polyols are those as described previously for the preparation of the melamine-polyol dispersion.

Suitable polyisocyanates include aliphatic, cycloaliphatic and aromatic multi-functional, particularly bifunctional, isocyanates. In detail, these include: aliphatic diisocyanates such as ethylene-, 1,4-tetramethylene-, 1,6-hexamethylene- and 1,12-dodecanediisocyanate; cycloaliphatic diisocyanates such as cyclohexane-1,3- and 1,4-diisocyanates as well as any desired mixture of these isomers, 1-isocyanato-3,3,5-trimethyl-5-isocyanatomethyl-cyclohexane, 2,4- and 2,6-hexahydrotoluene diisocyanate, as well as any desired mixtures of these isomers, 4,4'- and 2,4'-diisocyanatodicyclohexylmethane; aromatic diisocyanates such as 1,3- and 1,4-phenylene diisocyanate, 2,4- and 2,6-toluene diisocyanate, as well as any desired mixtures of these isomers, 2,2'-, 2,4'- and 4,4'-diphenylmethane diisocyanate, and naphthylene-1,5-diisocyanate; aromatic polyisocyanates such as 4,4',4''-triphenylmethane triisocyanate, 2,4,6-triisocyanatobenzene, and polyphenylene polymethylene polyisocyanates. Modified polyisocyanates such as carbodiimide group-containing polyisocyanates (German Patent 10 92 007), allophanate group-containing polyisocyanates (British Patent No. 994 890; Belgian Patent No. 761 626), isocyanurate group-containing polyisocyanates (German Patent No. 10 22 789, German Patent No. 12 22 067, German Patent No. 10 27 394, German Published Application No. 19 29 034, and German Published Application No. 20 04 048), urethane group-containing polyisocyanates (British Patent No. 752 261; U.S. Pat. No. 3,394,164), biuret group-containing polyisocyanates (German Patent No. 11 01 394, British Patent No. 889 050) and ester group-containing polyisocyanates (British Patent No. 964 474, British Patent No. 10,72,956, U.S. Pat. No. 3,567,763, German Patent No. 12 31 688) may also be used.

Preferred are the readily available aromatic di- and polyisocyanates such as 2,4- and 2,6-toluene diisocyanate as well as any desired mixtures of these isomers, 2,2'-, 2,4'- and 4,4'-diphenylmethane diisocyanate, as well as any desired mixtures of these isomers, mixtures of 2,2'-, 2,4'-, 4,4'-diphenylmethane diisocyanates and polyphenylene polymethylene polyisocyanates (crude MDI), mixtures of 2,4- and 2,6-toluene diisocyanates and crude MDI and carbodiimide-, urethane-, allophanate-, isocyanurate-, urea- and biuret group-containing polyisocyanates. The referenced di- and polyisocyanates may be used individually or in mixtures.

Suitable catalysts for accelerating the polyurethane formation between the polyols, water, chain extenders and polyisocyanates include, for example, tertiary amines such as dimethylbenzylamine, N,N,N',N'-tetramethyldiaminoethyl ether, bis-(dimethylaminopropyl)-urea, N-methyl and/or N-ethylmorpholine, dimethylpiperazine, 1,2-dimethylimidazole, 1-azobicyclo-(,3,3,0)octane, preferably triethylene diamine, metallic salts such as stannous octoate, lead octoate, stannous 2-ethylhexanoate, preferably tin-IV-salts such as dibutyltin dilaurate, dibutyltin diacetate, tetrabutyltin disulfide and bis-(tri-n-butyltin)oxide as well as mixtures of tertiary amines and organic tin salts. The weight of catalyst used is 0.1 to 5.0 weight percent based upon the weight of tertiary amine and/or 0.01 to 1.0 percent by weight of catalyst based upon the weight of tertiary amines and/or 0.01 to 1.0 percent by weight of metal salt to the polyol weight.

The commonly-used cyclization and polymerization catalysts for polyisocyanates have proven to work well for the preparation of polyisocyanurate foams. These include: strong bases such as quaternary ammonium hydroxide, for example, benzyltrimethylammonium hydroxide; alkali metal hydroxides such as sodium or potassium hydroxide; alkali metal alkoxides such as sodium methylate and potassium isopropylate; trialkylphosphines such as triethylphosphine; alkylaminoalkylphenols such as 2,4,6-tris-(dimethylaminomethyl)-phenol; 3- and/or 4-substituted pyridines, for instance, 3- or 4-methylpyridine; organic metal salts such as tetrakis-(hydroxyethyl)-sodium borate; Friedel-Crafts catalysts, for instance, aluminum chloride, iron-(III)-chloride, borofluoride and zinc chloride, and alkali metal salts of weak organic acids and nitrophenylates, such as, potassium octoate, potassium-2-ethylhexanoate, potassium benzoate, sodium picrate and phthalamide potassium. Preferably used are the strongly basic N,N',N''-tris-(dialkylaminoalkyl)-s-hexahydrotriazine such as N,N',N''-tris-(dimethylaminopropyl)-s-hexahydrotriazine.

The amount of catalyst employed for the preparation of the polyurethane plastics according to this invention is a function of the effectiveness of the catalysts under consideration. Generally, it has been found useful to use 1 to 15 parts by weight, preferably 3.5 to 10 parts by weight of catalyst per 100 parts by weight of organic polyisocyanate.

The blowing agents which may be used for the preparation of foamed polyurethanes and polyisocyanurates include water which reacts with the isocyanate groups to form carbon dioxide. The amount of water which can be used effectively is 0.1 to 3 percent based on the weight of the polyisocyanate. If required, larger quantities of water may also be used.

Other useable blowing agents are low-boiling liquids which vaporize under the influence of the exothermal polyaddition and/or polymerization reaction. Suitable are those liquids which are inert with respect to the organic polyisocyanates and have boiling points below 100° C. Examples of such used liquids are halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling liquids and/or mixtures of these liquids with other substituted or unsubstituted hydrocarbons may also be used.

The most effective quantity of blowing agent for the preparation of foamed polyurethane materials is a function of the foam density which it is desired to be achieved. Generally, quantities of 5 to 40 percent by weight per 100 parts by weight of organic polyisocyanate give satisfactory results.

Under certain circumstances, it is also appropriate to use chain extenders and cross-linking agents in addition to the higher molecular weight polyols for the preparation of foamed polyurethane. The chain extenders have molecular weights of less than 2000, preferably of 30 to 600, and preferably have two active hydrogen atoms. For example, such compounds as aliphatic and/or aromatic diols having 2 to 14, preferably 2 to 6, carbon atoms such as 1,2-propanediol, 1,2-pentanediol, 1,6-hexanediol, and preferably ethylene glycol, diethylene glycol, 1,4-butanediol and bis-(2-hydroxyethyl)hydroquinone, diamines such as ethylenediamine and possibly 3,3'- or 3,3',5,5'-di- and/or tetraalkyl or halogen-substituted 4,4'-diaminodiphenyl methanes, isophoronediamine, and ethanolamine may be employed. Suitable cross-linking agents include triethanolamine and polyhydroxyl compounds such as glycerine, trimethylolpropane, and low molecular hydroxyl group-containing alkylene oxide adducts of the above-mentioned chain extenders and cross-linking agents.

Additives may also be incorporated in the reaction mixture. Examples of these are surface-active foam stabilizers, hydrolysis-protection agents, pore regulators, fungistats, bacteriostats, dyes, pigments and flame-protection agents.

Also included are other surface-active materials. These include siloxane-oxyalkylene-mixed polymerizates and other organic polysiloxanes, oxyethylated alkylphenols, oxyethylated fatty alcohols, paraffin oils, castor oil and/or resinoleic ester and Turkish Red oil which are used in quantities of 0.2 to 6 parts by weight per 100 parts by weight of polyisocyanate.

In addition to melamine, other suitable flame-retardant agents may also be incorporated in the foam reaction mixture.

More detailed data on these additives are included in the literature, for example, the monograph by J. H.

Saunders and K. C. Frisch "High Polymers", Vol. 16, Polyurethanes, Parts 1 and 2, Interscience Publishers 1962 or 1964.

As indicated above, the melamine-polyol dispersions may be diluted with the above-mentioned polyols and thus may be adjusted to the desired filler content for the preparation of the foamed polyurethane plastics.

For the preparation of polyurethane foams, the polyisocyanates and polyols and/or mixtures of polyols and chain extenders and/or cross-linking agents are reacted in such quantities that the ratio of the Zerewitinoff active groups to NCO groups is 1:0.8 to 2.5, preferably 1:0.9 to 1.2, and particularly 1:1 and that the melamine content in the foamable represents 5 to 40 percent by weight, preferably 10 to 20 percent by weight based on the weight of the polyisocyanate-polyol mixture.

For the preparation of polyisocyanurate foams, the ratios of NCO groups of 6:1 to 60:1, preferably 2:1 to 10:1 polyisocyanate to hydroxyl groups have proven to work well. The melamine content is 3 to 40 percent by weight, preferably 10 to 20 percent by weight, based on the total weight of polyisocyanate and polyol.

The polyurethane foams may be produced either by the prepolymer or one-shot process, preferably according to the one-shot process. For this purpose, the polyisocyanates are mixed with the melamine-polyol dispersion and/or the polyols, catalysts, blowing agents and possibly chain extenders and additives in the quantity ratios previously mentioned at temperatures of 0° to 50° C., preferably 15° to 40° C., and the reaction mixture is then allowed to foam in open or closed, possibly temperature-controlled, molds.

The melamine-polyol dispersions according to this invention are preferably used for the manufacture of flexible slab foam since they show a cell-opening effect in addition to improving the flame resistance. If allowed to foam freely, the polyurethane foams have densities of 10 to 300 grams per liter with the polyurethane flexible foams having densities of 10 to 60 grams per liter, semi-rigid foams having densities of 60 to 130 grams per liter and the integral-skin foams having densities of 60 to 800 grams per liter. The polyurethane foams have a high degree of open-cells, good compression resistance, and flame resistance. Among other applications, they may be used in the construction industry for sound and thermal insulation. The products may be used for upholstery, for safety covers, as well as for shoe soles, arm supports, neck supports, seat cushions, and others. The polyisocyanurate foams have densities of 5 to 100 grams per liter, preferably of 10 to 50 grams per liter. Due to their excellent insulating properties, they are particularly well suited for double-band elements.

The parts referred to in the Examples are parts by weight.

EXAMPLES 1 TO 4

General Procedures

Melamine, polyol and stabilizers were mixed at approximately 25° C. and were subsequently ground in a bead mill containing glass beads with a diameter of 0.8 to 3 millimeters as grinding elements. The rotational speed of the bead mill was selected in such a manner that the local energy density with a rated output of 36 kilowatts was approximately 20 to 100 kilowatt hours per cubic meter and that the temperature was approximately 70° C. during the grinding process. The number of grinding passages was four. A sedimentation analysis of the resulting dispersion showed that less than 10 percent by weight of the melamine particles were larger than 10 microns.

The raw material components used, the water content, the storage stability, and the viscosity of the resultant melamine-polyol dispersions are summarized in Table 1.

TABLE 1

|  |  | Example No. | | | | Comparison Example |
|---|---|---|---|---|---|---|
|  |  | 1 | 2 | 3 | 4 | A |
| Polyether polyol based on trimethylol propane, 1,2-propylene oxide and ethylene oxide - molecular weight approximately 4800 - hydroxyl number approximately 35 | (parts) | 49 | 48 | 50 | 48 | 50 |
| Melamine | (parts) | 50 | 50 | 50 | 50 | 50 |
| Silicic acid (®Aerosil 200, manufacturer Degussa) obtained by flame hydrolysis | (parts) | 1.0 | 2.0 | — | 2.0 | — |
| Sodium lauryl sulfate (Duponol Me Dry, manufacturer Dupont) | (parts) | — | — | 0.04 | 0.04 | — |
| Potassium fluoroalkylcarboxylate (Fluorad FC 128, manufacturer 3M Co.) | (parts) | — | — | 0.01 | 0.01 | — |
| Water content | (% by wt.) | 0.08 | 0.07 | 0.06 | 0.8 | 0.1 |
| Viscosity after a storage period of 4 months |  |  |  |  |  |  |
| at 50° C. | (mPas) | 2550 | 2650 | 2450 | 3100 | 2500 |
| at 75° C. | (mPas) | 1150 | 1150 | 1050 | 1150 | 1150 |
| Comments: |  | Storage stable - no sediment formation | | | | slight sediment formation |

Comparison Examples B-P

Melamine, polyol and stabilizer were mixed at a temperature of 80° C. using a mixer based on the Stator-rotor principle having a gap width of 0.5 millimeters and a shaft diameter ratio of 4:1 and a rotation speed of 2000 min$^{-1}$ for a period of 60 seconds.

The raw materials used and the viscosities of the resultant melamine-polyol mixtures are summarized in Table 2.

TABLE 2

| Comparison Examples | B | C | D | E | F | G | H |
|---|---|---|---|---|---|---|---|

TABLE 2-continued

| | | | | | | | |
|---|---|---|---|---|---|---|---|
| Polyether polyol based on trimethylol propane, 1,2-propylene oxide and ethylene oxide - Molecular weight approx. 4800 Hydroxyl number approx. 35 (parts) | 50 | 49.5 | 50 | 50 | 49 | 48.75 | 47.5 |
| Melamine (parts) | 50 | 50 | 50 | 50 | 50 | 50 | 50 |
| Aerosil 200 (parts) | — | 0.5 | — | — | 1.0 | — | — |
| Duponol Me Dry (parts) | — | — | 0.04 | 0.04 | — | — | — |
| Fluorad FC 128 (parts) | — | — | 0.01 | — | — | — | — |
| Fluorad FC 170 (parts) | — | — | — | 0.01 | — | — | — |
| Turkish Red oil (parts) | — | — | — | — | — | 1.25 | 2.5 |
| Aluminum silicate (®Transpafill, manufactured by Degussa) (parts) | — | — | — | — | — | — | — |
| Precipitated silicic acid (Hoesch KS 300, manufacturer Hoesch Chemie, Dueren) (parts) | — | — | — | — | — | — | — |
| Water content in % by weight | — | — | — | — | — | — | 1.5 |
| Viscosity at | | | | | | | |
| 23° C. (mPas) | 800 | 620 | 480 | 1200 | 1200 | — | 11000 |
| 50° C.+ (mPas) | 1550 | 1850 | 1400 | 1500 | 2050 | 2300 | 2150 |
| Comments: | | | pronounced sedimentation | | weak | pronounced sedimentation - very difficult to redisperse | |

| Comparison Examples | J | K | L | M | N | O | P |
|---|---|---|---|---|---|---|---|
| Polyether polyol based on trimethylol propane, 1,2-propylene oxide and ethylene oxide - Molecular weight approx. 4800, Hydroxyl number approx. 35 (parts) | 45.0 | 42.5 | 40.0 | 45 | 40 | 45 | 40 |
| Melamine (parts) | 50 | 50 | 50 | 50 | 50 | 50 | 50 |
| Aerosil 200 (parts) | — | — | — | — | — | — | — |
| Duponol Me Dry (parts) | — | — | — | — | — | — | — |
| Fluorad FC 128 (parts) | — | — | — | — | — | — | — |
| Fluorad FC 170 (parts) | — | — | — | — | — | — | — |
| Turkish Red oil (parts) | 5.0 | 7.5 | 10.0 | — | — | — | — |
| Aluminum silicate (®Transpafill, manufactured by Degussa) (parts) | — | — | — | 5 | 10 | — | — |
| Precipitated silicic acid (Hoesch KS 300, manufacturer Hoesch Chemie, Dueren) (parts) | — | — | — | — | — | 5 | 10 |
| Water content in % by weight | 2.7 | 4.8 | 5.5 | 0.26 | — | 0.30 | — |
| Viscosity at | | | | | | | |
| 23° C. (mPas) | 18000 | 22000 | 30000 | 45000 | 50000 | 19000 | 180000 |
| 50° C.+ (mPas) | 2250 | 2050 | 1400 | 450 | 1150 | 1400 | 650 |
| Comments: | pronounced sedimentation - very difficult to redisperse | | | sediment | thixotropic, cannot be poured | settled [sedimentation] | firm [solid] paste |

+after redispersion

The Comparison Examples show that the melamine-polyol mixtures produced with the aid of such a mixer are not stable under storage conditions.

Preparation of Polyurethane Flexible Foams:

EXAMPLE 5

464 parts of a polyether polyol based on glycerine-propylene oxide-ethylene oxide with an OH number of 35, 491.6 parts of a melamine-polyol dispersion according to Example 4, 40 parts of trichlorofluoromethane, 19.6 parts of water, 7 parts of a surface-active substance (®Tegostab B 4690, by Goldschmidt, Essen), 1.4 parts of pentamethyldiethylene triamine, 1.4 parts of bis-[2-(N,N-dimethylamino)-ethyl]-ether, and 1.4 parts of a 33 percent solution of diazabicyclooctane in dipropylene glycol were mixed very thoroughly.

To this mixture were added 166 parts toluene diisocyanate (isomer ratio 2,4-:2,6-=80:20) and 89.4 parts of a mixture of diphenylmethane diisocyanates and polyphenyl polymethylene polyisocyanates (crude MDI) and the mixture is agitated at 1650 rpm for 8 seconds.

The mixture was introduced into a covered aluminum mold (40×40×10 centimeters) which had been heated to 40° C. After 5 to 15 minutes reaction time in the closed mold, the completed part was demolded.

A fine-celled open-celled foam was obtained. The physical properties were determined after the foam was cut. For the flammability test (B1, DIN 4102), the samples were produced in a wooden box having dimensions of 40×30×120 centimeters by free foaming.

EXAMPLES 6 TO 14

The procedure of Example 5 was employed using the raw materials in the amounts as specified in Table 3. The corresponding physical properties of the resulting foam are summarized in table 4.

In Table 3:

Polyol I is a polyether polyol based on propylene glycol-propylene oxide-ethylene oxide with an OH number of 28.

Polyol II is a polyether polyol based on trimethylol propane-propylene oxide-ethylene oxide with an OH number of 28.

Blowing Agent is trichlorofluoromethane.
Catalyst A is pentamethyldiethylenetriamine.
Catalyst B is bis-[2-(N,N-dimethylamino)-ethyl]ether.
Catalyst C is diazabicyclooctane-Formate.
Catalyst D is diazabicyclooctane-Formate 33 percent solution in dipropylene glycol.
B 4690 is ®Tegostab B 4690; surface-active agent commercial product by the Goldschmidt AG in Essen.
Mel. is pure melamine In accordance with the procedure of Example 4, melamine-polyol dispersions with a melamine content of 50 percent by weight were produced from Polyol I and/or Polyol II and melamine. The dispersion was subsequently diluted with additional Polyol I and/or Polyol II and was then processed. The quantities listed in Table 3 are based on weight of polyol and melamine.

TDI is a mixture of 2,4- and 2,6-toluene diisocyanate in a weight ratio of 80:20.

Crude MDI is a mixture of diphenylmethane diisocyanate and polyphenyl polymethylene polyisocyanates.

ureth. MDI is 4,4'-diphenylmethane diisocyanate modified with dipropylene glycol and low molecular polypropylene glycol ether with an NCO content of 28.6 percent (®Desmodur 44 P90 by Bayer AG).

sion was further diluted with 70 parts of the ethylene oxide-modified polypropylene glycol ether.

Using a foaming machine of the type Zippel DS 1 and with the addition of air, to this mixture were added 3 parts by weight of water, 0.6 parts by weight of a commercially available silicon foam stabilizer (Tegostab B 4113 by Goldschmidt AG in Essen), 0.8 parts by weight of 33 percent solution of triethylene diamine in dipropylene glycol, 0.5 parts by weight of triethylamine, 27.2 parts by weight of crude MDI, and 18.1 parts by weight of toluene diisocyanate (2,4- and 2,6-isomer mixture at a ratio of 80:20).

The resultant polyurethane foam had a porous surface skin which was open celled with no shrinkage. The foam was determined to have the following physical properties:

| | | |
|---|---|---|
| Density | DIN 53 420 | 43.7 kg/m³ |
| Tensile Strength | DIN 53 571 | 86 kPa |
| Elasticity | DIN 53 571 | 82% |
| Compression Strength | DIN 53 577 | |
| at 20% compression | | 2.1 kPa |
| at 40% compression | | 3.1 kPa |
| at 60% compression | | 6.5 kPa |
| Compression set | DIN 53 572 | 4.1% |
| at 90% deformation/70° C./22 hrs. | | |
| Elasticity | ASTM D 1564-71 | 53.3% |
| Air permeability (dynamic pressure) | | 0.29 mbar |
| According to DIN 4102/Part 1 (9.77) Classification as to | | No burning dripping construction Class B1 |

TABLE 3

Polyurethane Flexible Foams Prepared From The Melamine-Polyol Dispersions

| Example No. | Polyol [parts] | H₂O [parts] | Blowing Agent [parts] | Catalyst A [parts] | Catalyst B [parts] | Catalyst C [parts] | B 4690 [parts] | Mel. [parts] | TDI [parts] | Crude MDI [parts] | Ureth. MDI [parts] |
|---|---|---|---|---|---|---|---|---|---|---|---|
| 6 | 68.8 | 1.86 | 10.3 | 0.14 | 0.14 | 0.14 | 1.0 | 17.7 | — | — | 30.0 |
| 7 | 68.8 I | 1.86 | 10.3 | 0.14 | 0.14 | 0.14 | 1.0 | 17.7 | — | — | 35.4 |
| 8 | 68.8 I | 1.86 | 10.3 | 0.14 | 0.14 | 0.14 | 1.0 | 17.7 | — | — | 40.6 |
| 9 | 68.8 I | 1.86 | 10.3 | 0.14 | 0.14 | 0.14 | 1.0 | 17.7 | — | 33.0 | — |
| 10 | 82.4 I | 2.64 | — | 0.16 | 0.16 | 0.16 | 0.82 | 13.7 | 18.3 | — | 18.3 |
| 11 | 82.4 I | 2.64 | — | 0.16 | 0.16 | 0.16 | 0.82 | 13.7 | 23.3 | — | 10.0 |
| 12 | 69.2 II | 2.22 | 7.9 | 0.1 | 0.1 | 0.1 Cat. D | 0.52 | 19.8 | — | 8.0 | 32.0 |
| 13 | 66.5 I | 2.13 | 11.4 | 0.13 | 0.13 | 0.13 Cat. D | 0.5 | 19.0 | 16.9 | — | 11.25 |
| 14 | 61.3 I | 2.2 | 12.3 | 0.12 | 0.12 | 0.12 Cat. D | 0.86 | 23.0 | 17.9 | 9.6 | — |

TABLE 4

Physical Properties

| Example No. | Density [g/l] DIN 53 420 | Tensile Strength [KPa] DIN 53 571 | Elasticity [%] DIN 53 541 | Compression Hardness [N/mm²] DIN 53 577 | | | Flammability DIN 4102 |
|---|---|---|---|---|---|---|---|
| | | | | at 20% | at 40% | at 60% | |
| 5 | 40 | 45 | 95 | 0.15 | 0.25 | 0.4 | B2, B1 |
| 6 | 50 | 55 | 100 | 0.12 | 0.18 | 0.33 | B2, B1 |
| 7 | 51 | 90 | 85 | 0.39 | 0.55 | 0.94 | B2, B1 |
| 8 | 53 | 105 | 80 | 0.52 | 0.73 | 1.25 | B2, B1 |
| 9 | 30 | 30 | 85 | 0.14 | 0.20 | 0.4 | B2, B1 |
| 10 | 50 | 95 | 150 | 0.16 | 0.24 | 0.45 | B2, B1 |
| 11 | 49 | 100 | 180 | 0.48 | 0.70 | 1.05 | B2, B1 |
| 12 | 44 | 70 | 50 | 0.3 | 0.53 | 0.98 | B2, B1 |
| 13 | 26 | 30 | 135 | 0.16 | 0.47 | 0.94 | B2, B1 |
| 14 | 23 | 25 | 95 | 0.16 | 0.47 | 0.95 | B2, B1 |

EXAMPLE 15

Employing the procedure of Example 4, 30 parts of melamine were dispersed in 30 parts of a trifunctional ethylene oxide-modified polypropylene glycol ether (average molecular weight approximately 4800, OH number approximately 35 contining approximately 75 percent primary hydroxyl groups. The resultant disperconstruction class
According to DIN 4102, Part 1 (9.77)    no burning dripping

Comparison Example Q

Employing the procedure of Example 15 with a mixture of 100 parts of the trifunctional ethylene oxide-modified polypropylene glycol ether and 30 parts of melamine instead of the melamine-polyol dispersion, the resultant foam was elastic and flexible with a thick closed surface skin. Extreme shrinkage due to the closed cells occurred within a few minutes after completion of the blowing reaction.

EXAMPLE 16

The procedure of Example 15 was employed with the exception that 4 parts of water instead of 3 parts, 34.8 parts of crude MDI instead of 27.2 parts, and 23.2 parts of toluene diisocyanate instead of 18.1 parts were employed.

The resultant foam had a porous surface skin and was so open celled that no shrinkage occurred. The following physical properties were found:

| Density | DIN 53 420 | 32.6 kg/m³ |
|---|---|---|
| Tensile Strength | DIN 53 571 | 77 kPa |
| Breaking Elongation | DIN 53 571 | 79% |
| Compression Strength | DIN 53 577 | |
| at 20% compression | | 1.8 kPa |
| at 40% compression | | 2.5 kPa |
| at 60% compression | | 5.1 kPa |
| Compression Set | DIN 53 572 | |
| (at 90% deformation/70° C./22 h) | | 8.5% |
| Elasticity | ASTM D 1564-71 | 52.8% |
| Air Permeability (Dynamic Pressure) | | 0.38 mbar |
| Classification as to Construction Class According to DIN 4102/Part 1 (9.77) | | Construction Class B1 No burning dripping |

Comparison Example R

The procedure of Example 16 was employed with the exception that the melamine-polyol dispersion was replaced by a melamine-polyol mixture corresponding to Comparison Example Q. The resulting foam had a closed thick surface resulting in pronounced shrinkage.

The embodiments of the invention in which an exclusive privilege or property is claimed are defined as follows:

1. A stable melamine-polyol dispersion consisting of
(A) 5 to 70 percent by weight of melamine based on the total weight of melamine and polyoxyalkylene polyether polyol with 90 percent of the melamine particles having a particle size of less than 10 microns,
(B) 95 to 30 percent by weight of a polyoxyalkylene polyether polyol based on the weight of melamine and polyol, said polyoxyalkylene polyether polyol having a molecular weight of 200 to 16,000, and
(C) an effective amount of a stabilizer selected from the group consisting of (a) silicic acids and silicates, (b) salts of perfluorinated alkyl carboxylic acids having 4 to 20 carbon atoms; salts of alkyl sulfonic acids and perfluorinated alkylsulfonic acids having 4 to 20 carbon atoms and polyperfluoroether polyols having molecular weights of 300 to 6000, and (c) salts of fatty alcohol sulfates having 6 to 30 carbon atoms.

2. The dispersion of claim 1 wherein the polyoxyalkylene polyether polyol has a molecular weight of 200 to 8000.

3. The dispersion of claim 1 wherein the stabilizer is 0.001 to 20 percent by weight based on the weight of the melamine.

4. A process for the preparation of a stable melamine-polyol dispersion wherein a mixture of (A) 5 to 70 percent by weight of melamine, based on the total weight of melamine and polyoxyalkylene polyether polyol,
(B) 95 to 30 percent by weight of a polyoxyalkylene polyether polyol based on the total weight of melamine and polyol in the presence of
(C) an effective amount of a stabilizer selected from the group consisting of (a) silicic acids and silicates, (b) salts of perfluorinated alkylcarboxylic acids having 4 to 20 carbon atoms; salts of alkylsulfonic acids and perfluorinated alkylsulfonic acids having 4 to 20 carbon atoms and polyperfluoroether polyols having molecular weights of 300 to 6000, and (c) salts of fatty alcohol sulfates having 6 to 30 carbon atoms, is reduced in situ using high local energy densities in such a manner that 90 percent of the melamine particles have a particle size of less than 10 microns and that the materials are simultaneously dispersed.

5. The process of claim 4 wherein the local energy densities amount to 10 to 3000 kilowatt hours per cubic meter.

6. The process of claim 4 wherein the stabilizer is 0.001 to b 20 percent by weight based on the weight of the melamine.

7. In a process for the preparation of polyurethane foams by reaction of a polyoxyalkylene polyether polyol with an organic polyisocyanate, the improvement which comprises employing as the polyol component a melamine-polyol dispersion wherein the melamine is 5 to 70 percent by weight based on the total weight of melamine and polyol, wherein 90 percent of said melamine particles have a particle size of less than 10 microns.

8. The process of claim 7 wherein the melamine-polyol dispersion is stabilized with an effective amount of stabilizer selected from the group consisting of (a) silicic acids and silicates, (b) salts of perfluorinated alkylcarboxylic acids having 4 to 20 carbon atoms; salts of alkylsulfonic acids and perfluorinated alkylsulfonic acids having 4 to 20 carbon atoms and polyperfluoroether polyols having molecular weights of 300 to 6000, and (c) salts of fatty alcohol sulfates having 6 to 30 carbon atoms.

9. The process of claim 7 wherein the stabilizer is 0.001 to 20 percent by weight based on the weight of the melamine.

10. In the composition of polyurethane foam comprising the reaction product of a polyoxyalkylene polyether polyol with an organic polyisocyanate, the improvement which comprises employing as the polyol component a melamine-polyol dispersion wherein the melamine is 5 to 70 percent by weight based on the total weight of melamine and polyol, wherein 90 percent of said melamine particles have a particle size of less than 10 microns.

11. The composition of claim 10 wherein the melamine-polyol dispersion is stabilized with an effective amount of stabilizer selected from the group consisting of (a) silicic acids and silicates, (b) salts of perfluorinated alkylcarboxylic acids having 4 to 20 carbon atoms; salts of alkylsulfonic acids and perfluorinated alkylsulfonic acids having 4 to 20 carbon atoms and polyperfluoroether polyols having molecular weights of 300 to 6000, and (c) salts of fatty alcohol sulfates having 6 to 30 carbon atoms.

12. The composition of claim 10 wherein the stabilizer is 0.001 to 20 percent by weight based on the weight of the melamine.

* * * * *